United States Patent [19]

Schneider

[11] 3,761,627

[45] Sept. 25, 1973

[54] ARRANGEMENT FOR SYNCHRONIZING TELEVISION CAMERAS

[75] Inventor: Hans-Dieter Schneider, Gross-Gerau, Germany

[73] Assignee: Robert Bosch Fernsehanlagen GmbH, Darmstadt, Germany

[22] Filed: Dec. 16, 1971

[21] Appl. No.: 208,810

Related U.S. Application Data

[63] Continuation-in-part of Ser. No. 30,428, April 21, 1970, Pat. No. 3,655,913.

[30] Foreign Application Priority Data

Apr. 25, 1969 Germany .................. P 19 21 104.2
Dec. 19, 1970 Germany .................. P 20 62 749.0

[52] U.S. Cl. ......................................... 178/69.5 TV
[51] Int. Cl. ......................................... H04n 5/04
[58] Field of Search ................ 178/7.1, 7.2, 69.5 TV, 78/69.5 DC

[56] References Cited

UNITED STATES PATENTS 3,659,040 4/1972 Fujita .............................. 178/5.4 D
3,368,035 2/1968 Dennison ..................... 178/69.5 TV
3,165,585 1/1965 James ................................ 178/7.2
3,334,182 8/1967 Legler ......................... 178/69.5 TV

*Primary Examiner*—Robert L. Griffin
*Assistant Examiner*—George G. Stellar
*Attorney*—Michael S. Striker

[57] ABSTRACT

A synchronizing arrangement for television cameras in which a controllable oscillator is connected to an integrating circuit which generates a saw-tooth signal. This saw-tooth signal is, in turn, applied to a monostable multivibrator. The amplitude of the saw-tooth signal is varied by a control signal derived from a phase comparator which compares the phase of the output signal from the oscillator with a reference signal. The amplitude of the saw-tooth signal is varied so that the output signal of the monostable multivibrator is compensated against time dependent variations of oscillator output signal.

11 Claims, 3 Drawing Figures

ARRANGEMENT FOR SYNCHRONIZING TELEVISION CAMERAS

BACKGROUND OF THE INVENTION

This application is a continuation-in-part application of the parent application Ser. No. 30,428, now U.S. Pat. No. 3,655,913.

The parent application relates to an arrangement for synchronizing a television camera, in which the camera is connected to a camera control unit through a camera cable. The television camera has a controllable oscillator which oscillate at line frequency, and the output signal from the oscillator is applied, through the camera cable, to a phase comparator circuit within the camera control unit. The phase comparator serves to compare the output signal from the oscillator with a reference signal, and the resulting phase difference is used to generate a regulating voltage which is, in turn, applied to the controllable oscillator through the camera cable.

Through the preceding circuit arrangement crosstalk disturbances are prevented between the video signal line in the camera cable leading from the camera to the control unit, and the signal line within the cable carrying a signal in opposite direction to the video signal. This results from the condition that a DC voltage which cannot produce disturbing effects in the video signal, is trasmitted from the control unit to the camera.

In operation of the preceding circuit arrangement, however, it has been found that a disturbing effect still prevails, as a result of cross-talk between the video signal to the line which transmits the regulating DC voltage from the control unit to the camera.

It has been found that the line carrying the regulating DC voltage is subjected to cross-talk portions of the video signal of rapid oscillations with small amplitude of the synchronizing pulses. These oscillations result in corresponding oscillations of the lines in the television picture, which is often referred to as "jitter".

To avoid this disturbing effect, a monostable multivibrator is provided, in accordance with the present invention in the preceding circuit arrangement, and in particular, in the television camera. This monostable multivibrator is actuated or controlled by a saw-tooth signal derived from the oscillator. The amplitude of this saw-tooth signal is varied by the regulating DC voltage, so that the output signal from the monostable multivibrator compensates against the variations of the oscillator output signal.

In the design of the present invention the oscillator is constructed in the form of an astable multivibrator which provides a pulse-shaped output signal. In accordance with the present invention, furthermore, the output signal from the oscillator is integrated to form a saw-tooth signal and, this saw-tooth signal is then applied to the monostable multivibrator. The integrator uses a transistor having its base connected to the output of the oscillator, through a differentiating network. The transistor, together with a capacitor and a resistor, forms the integrator.

SUMMARY OF THE INVENTION

It is an object of the present invention to avoid the cross-talk disturbing effects in a camera cable connecting a television camera to a camera control unit, as set forth.

It is also an object of the present invention to provide an arrangement of the foregoing character which may be readily fabricated and assembled.

It is a still further object of the present invention to provide a circuit arrangement which avoids the cross-talk effects, as set forth, and may be economically maintained.

The present invention achieves these preceding objects by providing, within the television camera, an oscillator having its output directly connected to an integrator. The output of the integrator is, in turn, connected to a monostable multivibrator which applies its output pulses to the horizontal deflection generator. The output of the oscillator is also applied to a phase comparator present within a camera control unit. This phase comparator compares the output signal from the oscillator with a reference pulse signal, and generates a DC regulating voltage depending upon the phase difference between the pulse train from the oscillator and the reference signal. The output of the phase comparator is used to adjust, in turn, the controllable oscillator. The line connecting the output of the oscillator to the phase comparator, as well as the line connecting the output of the phase comparator to the control input of the oscillator, are both within the same cable. Also within this cable is the line carrying the video signal to the camera control unit. The output of the phase comparator is also connected to the output of the integrator prior to being applied to the monostable multivibrator. A resistor is used to isolate or decouple the oscillator from the monostable multivibrator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figures 1, 2, 3:
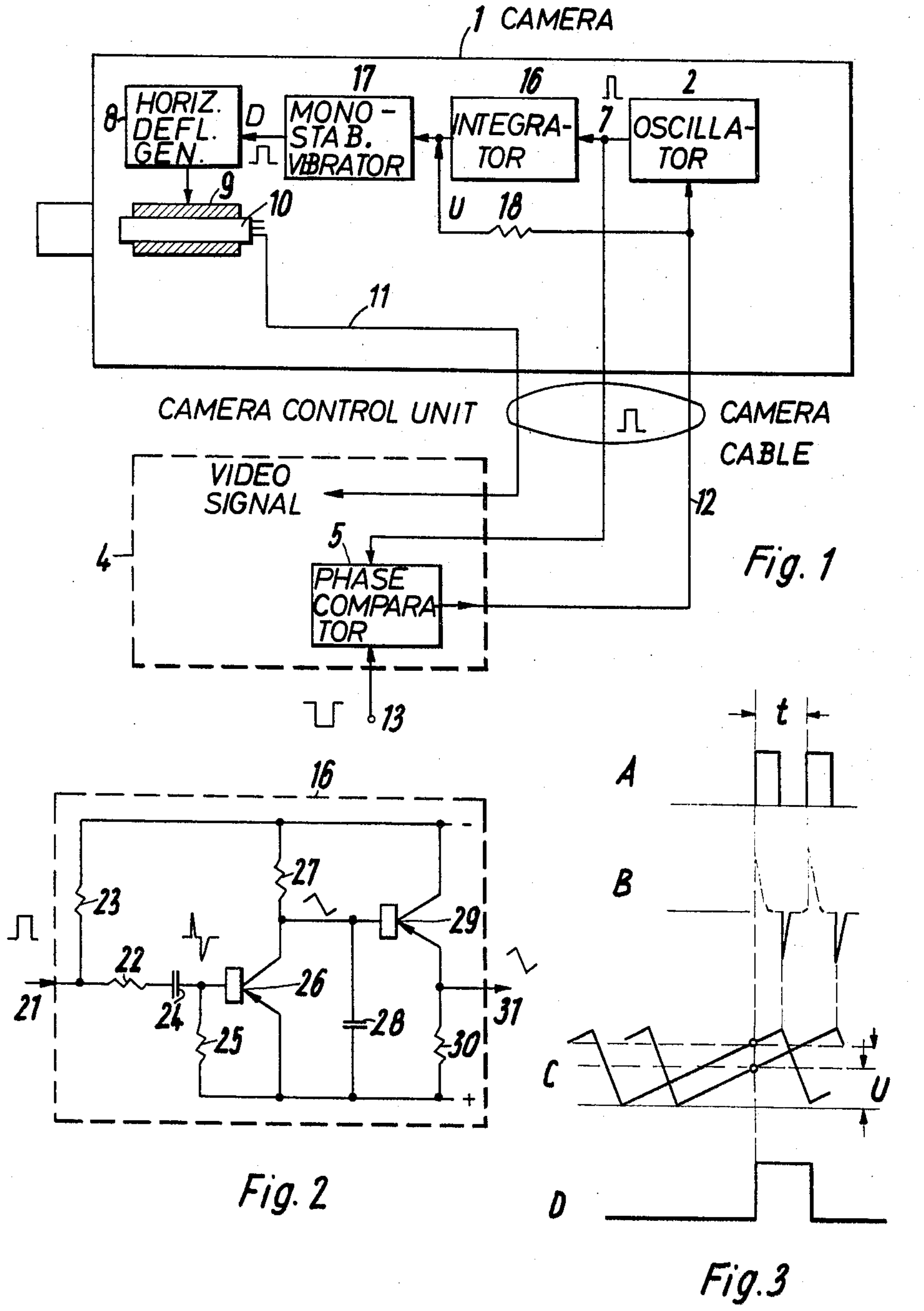
FIG. 1 is a block diagram of the circuit arrangement, in accordance with the present invention, and shows the essential components as well as their interconnections.
FIG. 2 is a circuit diagram of an integrator used in the arrangement of FIG. 1.
FIG. 3 are waveform diagrams of signals prevailing in the circuit arrangement of FIG. 1.

Referring to the drawing, FIG. 1 shows a television camera 1 having an oscillator 2 which oscillates at line frequency. This oscillator is designed in the form of an astable multivibrator which provides a pulse-shaped output signal at the terminal 7.

In accordance with the present invention the television camera 1 is furthermore, provided with a monostable multivibrator 17 which is controlled in operation through a saw-tooth voltage. This saw-tooth voltage is generated or derived from the pulse-shaped output signal of the oscillator 2, by means of the integrator 16. Thus, the integrator 16 converts the pulses from the oscillator 2 into saw-tooth-shaped pulses. These saw-tooth pulses are, in turn, used to actuate and operate the monostable multivibrator 17.

The oscillator 2 provides rectangular-shaped pulses having a pulse repetition frequency equal to the oscillator frequency. These rectangular-shaped pulses generated by the oscillator 2 are applied to one input of a phase comparator 5 within a camera control unit 4. A reference signal in the form of a pulse train, furthermore, is applied to the other input 13 of the phase comparator. The phase comparator compares the phase relationship of the pulses from the oscillator 2 with the reference pulses applied at the terminal 13, and provides therefrom a DC regulating voltage which is dependent upon the time difference of the pulse-shaped input signals being compared. The output signal from the phase comparator 5 is applied, through the conductor 12, to the oscillator 2, as already known in the art.

In accordance with the present invention, the DC regulating voltage signal from the output of the phase comparator 5 is, additionally, superimposed upon the saw-tooth voltage for the purpose of controlling the horizontal deflection generator 8. Thus, the DC output voltage from the phase comparator 5 is applied simultaneously to both the oscillator 2 and to the output of the integrator 16. This arrangement, thereby compensates for the signal variations as a function of time, which result from cross-talk of the line 11 of the camera cable to the conducting line 12 of this same cable. The line 11, or conductor cable 11 transmits the video signal from the camera pickup tube 10 to the camera control unit 4. A resistor 18 is provided between the output of the phase comparator 5 and the output of the integrator 16, to which the DC regulating voltage from the comparator is applied. This resistor 18 serves to decouple the oscillator 2 from the monostable multivibrator 17.

FIG. 2 shows a practical circuit for the integrator 16 when the oscillator 2 provides pulse-shaped output signals. This integrating circuit 16 includes a capacitor 24 connected to a resistor 25 for functioning as a differentiating network. The junction of the capacitor 24 and resistor 25 is connected, in turn, to the base of a transistor 26. The input terminal 21 of the integrator leads to the capacitor 24, through a resistor 22. A resistor 27 is connected between the collector of the transistor 26 and the negative voltage supply source. A resistor 23, furthermore is connected between the input terminal 21 and the negative voltage supply source. The positive voltage supply is connected to the emitter of the transistor 26 and one terminal of a resistor 25 which has its other terminal connected to the base of this transistor 26.

The input signal applied to the input terminal 21 of the integrator 16, is first differentiated through the differentiating network 24, 25, and is then applied to the base of the transistor 26. The signal appearing at the collector of the transistor 26 becomes then integrated through the combination of the resistor 27 and a capacitor 28 connected between the collector of the transistor 26 and its emitter. Thus, the capacitor 28 is connected in parallel with the emitter collector path of a transistor 26. The integration process serves to generate a saw-tooth signal from the narrow pulses derived from the trailing edge of the input pulses. A second transistor 29 is provided for the purpose of impedance conversion. The base of this transistor 29 is connected directly to the collector of the transistor 26 and to the junction of the resistor 27 and the capacitor 28. A resistor 30 is connected between the positive voltage supply and the emittter of the transistor 29, whereas the collector of this transistor is connected directly to the negative voltage supply. The saw-tooth signal appears across the emitter-resistor 30 and may be taken from the integrator, at the output terminal 31.

FIG. 3 shows waveform diagrams of signals in the circuit of the present invention. Waveform A shows the output pulses from the oscillator 2, which, in a preferred embodiment, is an astable multivibrator. These output pulses from the oscillator 2 have oscillations within the time interval *t*.

Waveform B, in FIG. 3, represents the result obtained from differentiating the waveform A. Thus the waveform B has spike-shaped positive and negative portions corresponding to the trailing and leading edges of the pulses in waveform A. Waveform C is a saw-tooth signal which results from the integration of the trailing edge of the pulses in waveform A. This saw-tooth signal is then applied for controlling the monostable multivibrator 17. The instant of switching control is determined by the amplitude of the saw-tooth signal, and this in turn, becomes shifted through the regulating DC voltage signal, so that variations in the interval t of the pulses generated by the oscillator, become compensated and the output signal of the monostable multivibrator 17 no longer has signal variations as a function of time.

It will be understood that each of the elements described above, or two or more together, may also find a useful application in other types of synchronizing arrangements of television cameras differing from the types described above.

While the invention has been illustrated and described as embodied in synchronizing arrangements of television cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended claims.

I claim:

1. In television camera equipment having a television camera for furnishing a video signal, deflection signal generator means and a system for synchronizing said deflection signal generator means to a reference signal, said equipment comprising controllable oscillator means mounted in said camera for furnishing a first signal having a frequency corresponding to a regulating voltage applied thereto, a control unit remote from said camera for monitoring said video signal and having phase comparison means for comparing the phase of said first signal to the phase of said reference signal and furnishing a regulating signal as a function of the difference therebetween, said equipment further having a cable having first conductor means for carrying said video signal from said camera to said control unit, second conductor means for carrying said first signal from said camera to said control unit and third conductor means carrying said regulating voltage from said control unit to said camera, whereby crosstalk from said first conductor means to said third conductor means causes unwanted variations in said regulating voltage and corresponding time jitter in said first signal, an arrangement for compensating for said time jitter, comprising, in combination, said timing signal furnishing means connected to the output of said controllable oscillator means for furnishing a timing signal having an amplitude varying as a predetermined function of time in synchronism with said first signal; additional oscillator means connected to said timing signal furnishing means, for furnishing a synchronizing signal at a time instant when the amplitude of said timing signal is equal to a predetermined amplitude; means connecting said third conductor means to said timing signal furnishing means in such a manner that said amplitude of said timing signal varies in correspondence to said regulating signal and in a direction to compensate for said time jitter in said first signal; and means applying said synchronizing signal to said deflection signal generator means.

2. An arrangement as set forth in claim 1, wherein said timing signal furnishing means comprise sawtooth signal generator means furnishing a sawtooth timing signal.

3. An arrangement as set forth in claim 2, wherein said additional oscillator means comprise monostable multivibrator means.

4. An arrangement as set forth in claim 3, wherein said controllable oscillator means furnish a sequence of pulses constituting said first signal.

5. An arrangement as set forth in claim 4, wherein said sawtooth generating means comprise integrating means.

6. An arrangement as set forth in claim 5, wherein said sawtooth generating means comprise differentiating means connected to the output of said controllable oscillator means, and wherein said integrating means are connected to the output of said differentiating means for integrating a portion of the so-differentiated signal thereby forming said sawtooth signal.

7. The arrangement as defined in claim 6, wherein said differentiating means comprises a resistance-capacitance network.

8. The arrangement as defined in claim 6, wherein said differentiating means comprises capacitor means having one electrode connected to the output of said oscillator means; and resistor means connected to the other electrode of said capacitor means.

9. An arrangement as set forth in claim 8, wherein said sawtooth generating means further comprise transistor means having a base connected to the junction of said capacitor means and said resistor means.

10. An arrangement as set forth in claim 9, wherein said integrating means comprise capacitor means connected between the emitter and collector of said transistor means.

11. An arrangement as set forth in claim 10, further comprising an emitter follower stage connected to the output of said integrating means.

* * * * *